(12) United States Patent
Sukegawa et al.

(10) Patent No.: US 6,332,643 B1
(45) Date of Patent: Dec. 25, 2001

(54) CENTER PILLAR STRUCTURE

(75) Inventors: Akihiro Sukegawa; Akira Nakashima, both of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/412,400

(22) Filed: Oct. 5, 1999

(30) Foreign Application Priority Data

Oct. 15, 1998 (JP) .................................................. 10-293959

(51) Int. Cl.$^7$ .................................................. B60R 27/00
(52) U.S. Cl. ...................... 296/203.03; 296/205; 296/193
(58) Field of Search .............................. 296/205, 203.01, 296/203.03, 193, 187

(56) References Cited

U.S. PATENT DOCUMENTS

| | | | |
|---|---|---|---|
| 3,776,589 | * 12/1973 | Barenyi et al. | 296/187 |
| 4,252,364 | * 2/1981 | Toyama et al. | 296/185 |
| 4,294,487 | * 10/1981 | Nakamura | 296/188 |
| 4,736,981 | * 4/1988 | Barton et al. | 296/201 |
| 4,872,703 | * 10/1989 | Saito | 280/804 |
| 4,971,359 | * 11/1990 | Takahashi et al. | 280/808 |
| 4,986,597 | * 1/1991 | Clausen | 296/203.01 |
| 5,092,649 | * 3/1992 | Wurl | 296/203.03 |
| 5,094,504 | * 3/1992 | Wurl | 296/203.03 |
| 5,242,209 | * 9/1993 | Yamauchi | 296/188 |
| 5,246,264 | * 9/1993 | Yoshii | 296/209 |
| 5,382,071 | * 1/1995 | Enning et al. | 296/203.03 |
| 5,398,989 | * 3/1995 | Winter et al. | 296/205 |
| 5,586,799 | * 12/1996 | Kanemitsu et al. | 296/203 |
| 5,671,968 | * 9/1997 | Masuda et al. | 296/188 |
| 5,820,198 | * 10/1998 | Nozaki | 296/146.9 |
| 6,047,626 | * 4/2000 | Lair et al. | 296/203.01 |

* cited by examiner

Primary Examiner—Stephen T. Gordon
Assistant Examiner—Hilary Gutman
(74) Attorney, Agent, or Firm—Sughrue Mion, PLLC

(57) ABSTRACT

A center pillar includes an upper member 2 and a lower member 3. The upper member 2 is joined by welding to the lower member 3, such that the upper member 2 is positioned inwardly relative to the lower member 3 in a transverse direction of a vehicle body and is inclined rearward relative to the lower member 3 in longitudinal direction of the vehicle body. In addition, an upper end portion of the lower member 3 has an end face that faces transversely outward and inclines downwardly. A reinforcement plate 6 extends to an upper end portion of the upper member and is joined thereat to the upper member for reinforcement of a state in which the lower member 3 is joined to a side sill 5.

6 Claims, 6 Drawing Sheets

CENTER PILLAR STRUCTURE

BACKGROUND OF THE INVENTION

1. Field of the Invention

The present invention relates to a center pillar structure for a vehicle body.

2. Description of the Related Art

Conventionally, using aluminum for structural members of a vehicle body has been considered as a means for reducing the weight of a vehicle. In addition, a frame structure shown in FIG. 5 is one of those designed for passenger vehicles. A center pillar 11 of such a frame structure is displaced at an upper portion thereof inwardly in a transverse direction of the vehicle body so as to correspond to the surface of a side window glass, while at a lower portion the centerpillar 11 is displaced in such a manner as to project outwardly in the transverse direction of the vehicle body so as to accommodate a seat belt retractor.

It is difficult to form the center pillar 11 with an aluminum extruded frame structure, since the configuration of the center pillar 11 is relatively complicated as described above. In addition, it is necessary to cut a portion of the frame after a bending process in order to secure a high accuracy at the joined portions of the frame. The cutting process is complicated and it is hard to form the center pillar as designed. In addition, an aluminum material is first extrusion molded into, for instance, a shape having a quadrangular hollow cross-section. After extrusion molding, the aluminum member is subjected to a bending process as shown in FIG. 6 to achieve the desired configuration. Consequently, a problem arises in which the aluminum member breaks at the time of bending.

SUMMARY OF THE INVENTION

To solve the aforesaid problems, it is an object of the invention to improve workability and degree of freedom of design of a center pillar formed of an extrusion molding.

To attain the above object, according to the present invention, a center pillar structure is provided at an intermediate portion in a longitudinal direction of a vehicle body in such a manner as to erect thereat. The center pillar includes: an extrusion molded upper member; and an extrusion molded lower member, an upper end portion of the lower member being joined with a lower end portion of the upper member so that the lower member is positioned outwardly relative to the upper member in a transverse direction of the vehicle body. The upper end portion of the lower member is cut in a transversely outward and downwardly inclined direction of the vehicle body.

According to the above center pillar structure, the center pillar is divided into upper and lower members that are joined to each other with the upper member being positioned inwardly relative to the lower member in the transverse direction of the vehicle body. Consequently it is possible to form easily a configuration inherent in a center pillar in which a lower half below a so-called waist line of the vehicle body and an upper half are positioned, respectively, outwardly and inwardly relative to each other in the transverse direction of the vehicle body. Also, it is easy to reduce the concentration of stress to the joined portion where strength is markedly increased due to welding by cutting a portion of the joined portion of the lower member that project outwardly in the transverse direction of the vehicle body in an inclined fashion.

In addition, according to the center pillar structure wherein the upper member is joined to the lower member in such a manner that the upper member is inclined rearward in the longitudinal direction of the vehicle body, it is possible to easily form a center pillar into a configuration in which the center pillar is bent in the longitudinal direction of the vehicle body.

Furthermore, according to the center pillar structure wherein a lower portion of the lower member is joined to a side sill of a floor portion of the vehicle body, wherein a reinforcement plate is secured to an outer side of the lower member in the transverse direction of the vehicle for reinforcement of the joined portion of the lower member with the side sill, and wherein the reinforcement plate is made to extend so as to overlap a lower portion of the upper member and is then joined thereto, the joined portion of the two members can be concealed by an extension portion of the reinforcement plate for reinforcing the joined portion of the lower member with the side sill.

DETAILED DESCRIPTION OF THE PREFERRED EMBODIMENTS

Referring to an embodiment shown in the accompanying drawings, a mode of operation of the present invention will be described in detail below.

Figure 1:
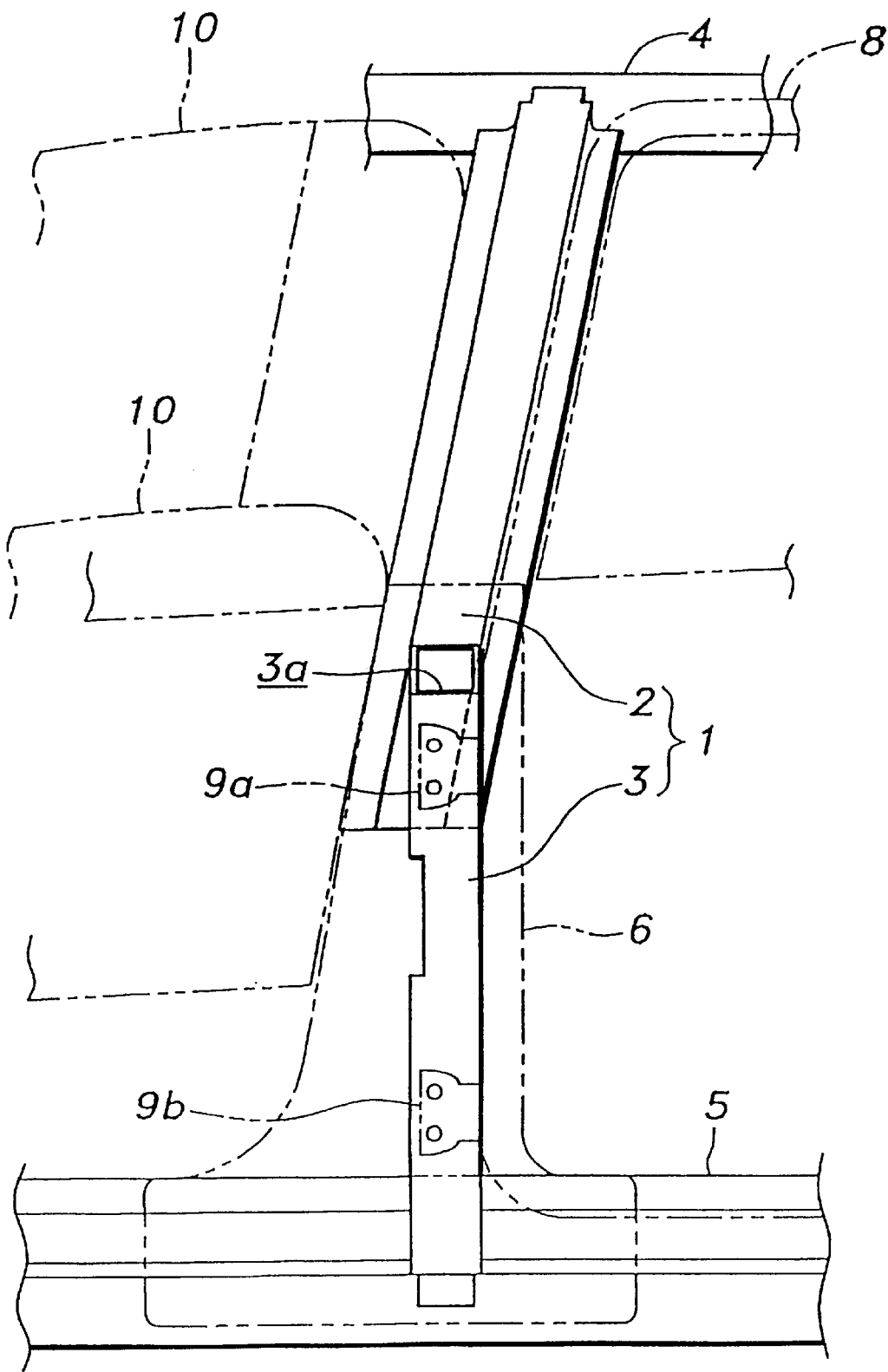
FIG. 1 is a side view of a center pillar 1 of a vehicle to which the present invention is applied as viewed from the side of a vehicle body.

FIG. 1 is a side view showing a center pillar 1 of a vehicle to which the present invention is applied, as viewed from the side of the vehicle. As shown in the figure, the center pillar 1 is provided at an intermediate portion in a longitudinal direction of a vehicle body on left and right sides of a passenger compartment in such a manner as to erect thereat. This center pillar 1 may impose restrictions on opening configurations for front and rear doors for ingress into and/or egress from front and rear seats, locations for mounting hinges for the rear door to the rear seats and the configuration of a window of the rear door.

Figure 2:
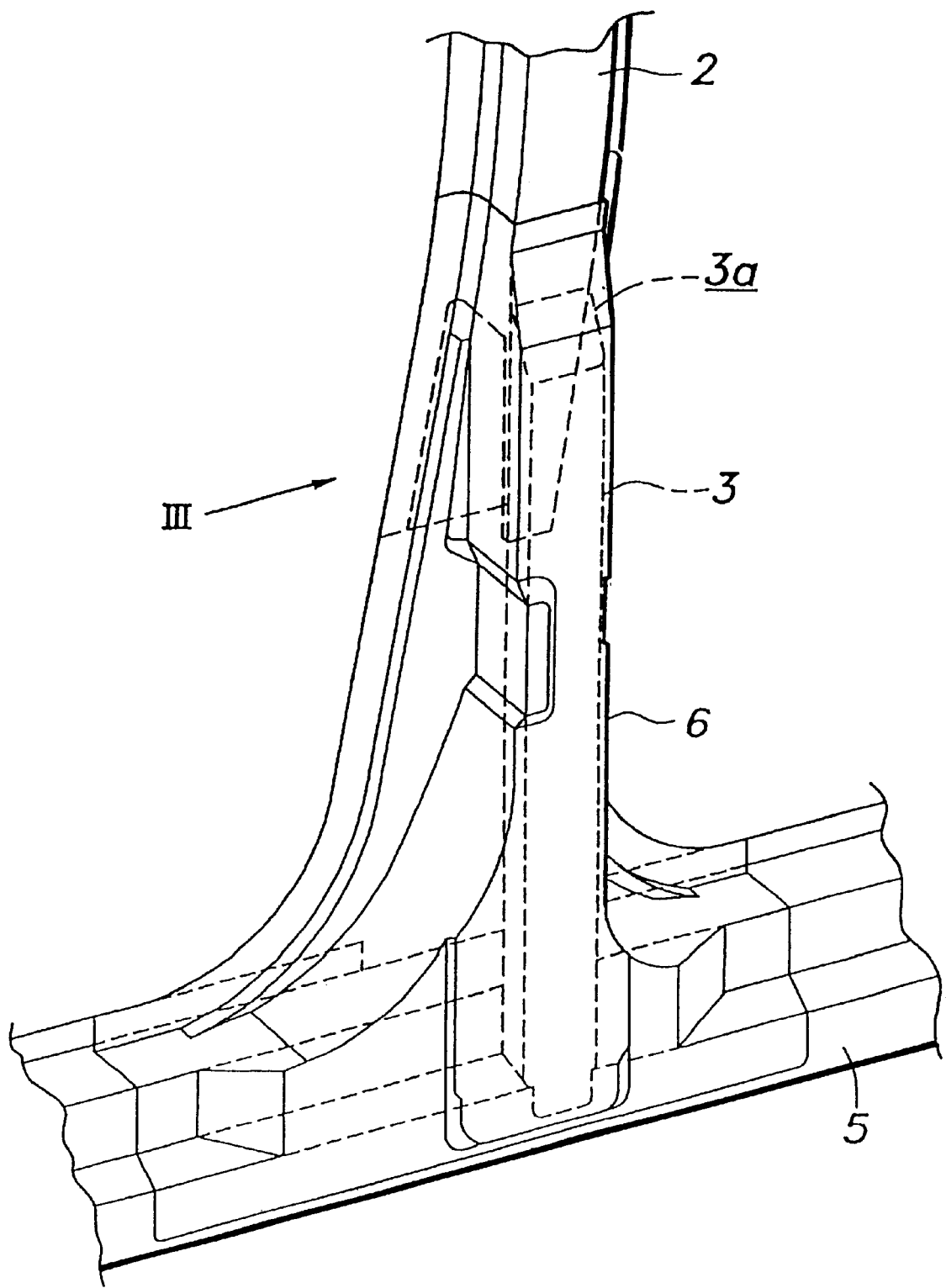
FIG. 2 is a perspective view of a lower portion of the center pillar 1 based on the present invention as a main part thereof.
Figure 3:
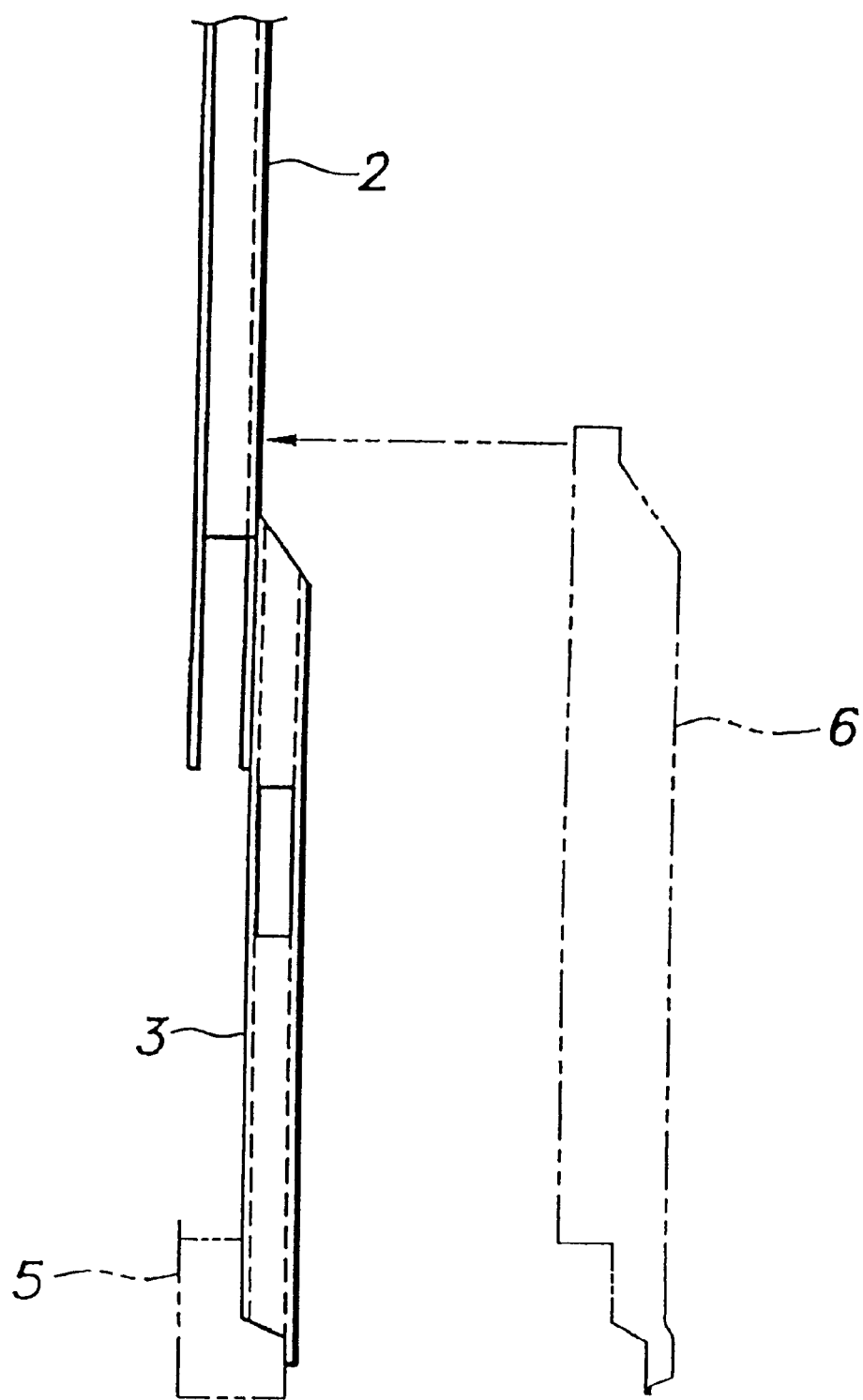
FIG. 3 is an exploded view of the main part as viewed in a direction indicated by an arrow III of FIG. 2.

FIG. 2 is a perspective view showing a lower half of the center pillar 1 according to the present invention as a main part thereof, and FIG. 3 is an exploded view of the main part as viewed in a direction indicated by an arrow III. As shown in FIGS. 1 to 3, the center pillar 1 is constructed such that an upper member 2 and a lower member 3, which are divided into two halves at an intermediate portion, are vertically joined together. Each of the members 2, 3 is extrusion molded from aluminum into a shape having a substantially quadrangular hollow cross-section. An upper end portion of the upper member 2 is securely welded to a roof side rail 4, while a lower end portion of the lower member 3 is securely welded to a side sill 5 of a floor portion, and a lower portion of the upper member 2 and an upper portion of the lower member 3 are joined together by welding.

The lower member 3 is disposed substantially perpendicular to the side sill 5, while the upper member 2 is inclined rearward relative to the upper portion of the lower member 3 in a longitudinal direction of the vehicle body, and the upper and lower members are joined to each other such that the joined portion is disposed inwardly of the lower member 3 in a transverse direction of the vehicle body. Then, as described above, the upper member 2 and the lower member 3 are welded to be joined where the upper portion of the latter and the lower portion of the former overlap with each other, whereby the center pillar 1 is formed in which the two members 2, 3 are made integral with each other. Thus, as better shown in FIG. 1, the center pillar 1 based on the present invention is given a shape in which the center pillar 1 is bent at the intermediate portion thereof (in the vicinity of the waist line of the vehicle body) so as to be formed into a substantially V-like shape, or more specifically, a shape of a V which is turned clockwise through 90 degrees. According to the present invention, even such a shape can be formed with ease.

Figure 4:
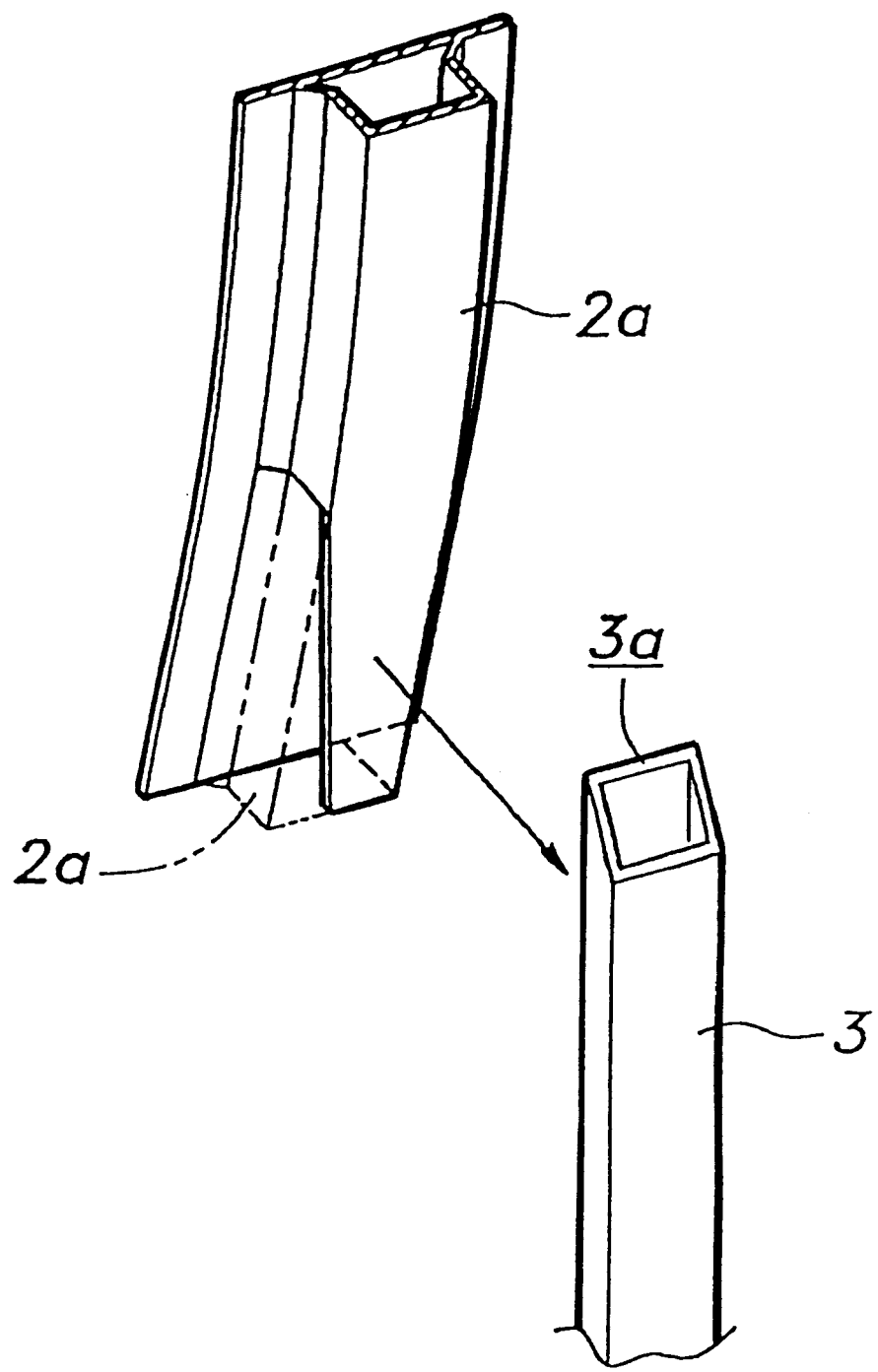
FIG. 4 is an exploded perspective view showing a joining procedure of upper and lower members.
Figure 5:
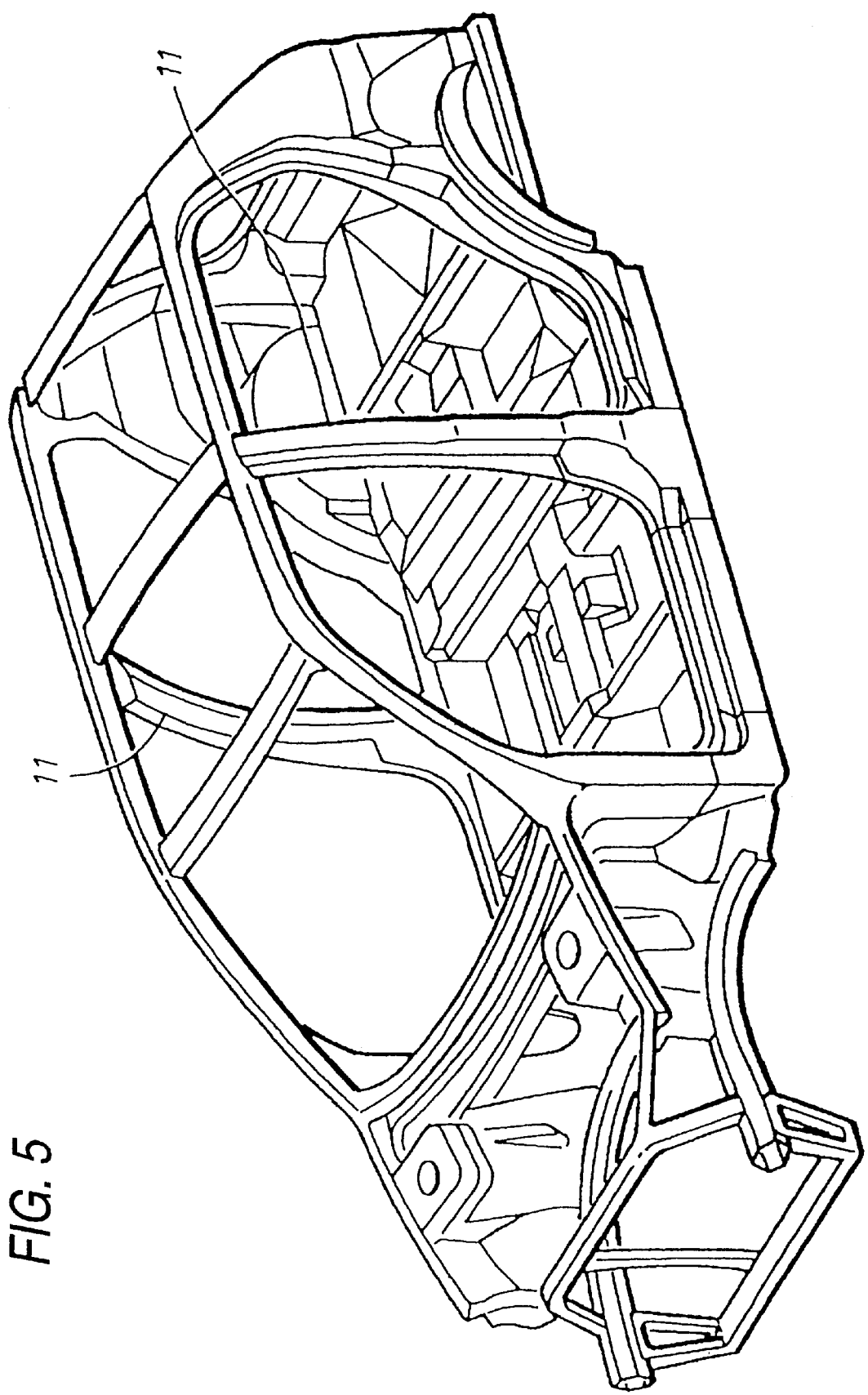
FIG. 5 is a schematic perspective view showing a frame structure of an automotive vehicle.
Figure 6:
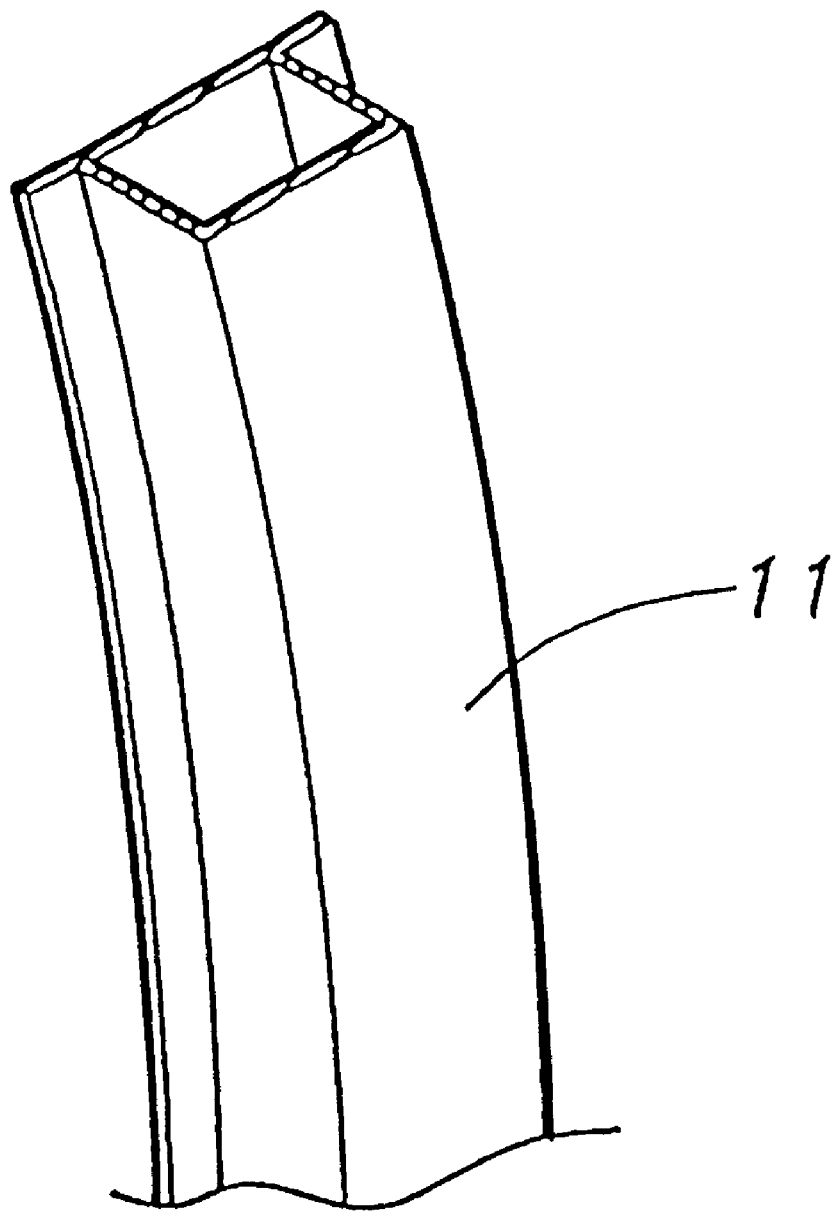
FIG. 6 is a perspective view showing a main part of a conventional center pillar.

In addition, when the upper and lower members 2, 3 are joined together such that they intersect with each other as described above, a part of the lower end portion of the upper member 2 protrudes from where the upper member 2 overlaps the lower member 3 (i.e., where they are welded to be joined together) as indicated by imaginary lines shown in FIG. 4. According to the present invention, the protruding portion 2a is cut, and although this reduces the strength thereat, since the strength of the portion where the two members 2, 3 are securely welded together is extremely increased when compared to those of the other portions, the overall strength is appropriately balanced even in a state in which the protruding portion 2a is cut.

An inverted T-shaped reinforcement plate 6 is attached to an outer side of the lower portion of the center pillar 1 in a transverse direction of the vehicle body for reinforcement of the joined portion where the lower member 3 is joined to the side sill 5 in such a manner as to cover the lower member 3 and extend over corresponding portions of the side sill 5. In addition, an upper end face 3a of the lower member 3 is cut, as shown in FIG. 4, in a transversely outward and downwardly inclined direction, thus preventing the generation of concentration of stress to where the two members 2, 3 are joined together.

Furthermore, an upper end portion of the reinforcement plate 6 to extends so as to cover the upper end face 3a of the lower member 3 and then to reach the lower portion of the upper member 2, where the upper end portion of the plate 6 is securely welded to the upper member 2. Thus, the reinforcement plate 6 reinforces the joint between the lower member 3 and the side sill 5 but also the joint between the lower member 3 and the upper member 2. Moreover, since the joined portions where the lower member 3 is joined to the side sill 5 and the upper member 2, respectively are concealed, the appearance is aesthetically improved. A pair of upper and lower door hinges 9a, 9b are fixedly screwed to the lower member 3 for a rear door 8.

According to the present invention, the upper member 2 is joined to the lower member 3 such that the upper member 2 recedes rearward slantingly relative to the lower member 3, and this permits expansion of an upper rear portion of a front seat window 10 for the front seat toward the rear of the vehicle body, thereby making it possible not only to ease ingress and egress of the driver and a front seat passenger but also to increase the glass area of the front seat window 10. In addition, since the lower member 3 is positioned relatively forward, the selection of space for mounting the door hinges 9a, 9b is also improved.

Thus, according to the present invention, since the center pillar is divided vertically into two members, and the upper and lower members are joined to each other with the upper member being positioned inwardly relative to the lower member in the transverse direction of the vehicle body, it is possible to easily form a configuration inherent in a center pillar in which a lower portion below the waist line of the vehicle body and an upper portion thereabove are positioned, respectively, transversely outward and inward relative to each other. Also, since the portion of the lower member is cut slantingly which protrudes transversely outwardly from the joined portion so as to prevent the concentration of stress to the joined portion where the strength is extremely increased due to welding, it is possible to adopt a frame structure using extruded members with no problem.

Moreover, since the center pillar configuration can easily be formed in which the center pillar is bent in the longitudinal direction of the vehicle body by joining the upper member to the lower member such that the upper member is inclined relative to the lower member in the longitudinal direction of the vehicle body, it is possible not only to ease ingress and egress of the driver and the other passengers but also to increase the opening space for the glass area of the front seat window. Furthermore, since using an extrusion molded material with a shape having, for instance, a quadrangular hollow cross-section can increase the rigidity of the structure much when compared to using a pressed member of the same configuration, the selection of space for mounting the door hinges can be improved. In addition, the extension of the upper portion of the reinforcement plate attached to the lower member and the side sill can conceal the joined portion between the two members, thereby making it possible to improve the appearance thereof aesthetically.

While only certain embodiments of the invention have been specifically described herein it will apparent that numerous modifications may be made thereto without departing from the spirit and scope of the invention.

The present disclosure relates to the subject matter contained in Japanese patent application No. Hei.10-293959 filed on Oct. 15, 1998 which is expressly incorporated herein by reference in its entirety.

What is claimed is:

1. A center pillar structure in which a center pillar is provided at an intermediate portion in a longitudinal direction of a vehicle body, said center pillar comprising:
   an extrusion molded upper member; and
   an extrusion molded lower member, an upper end portion of said lower member being joined with a lower end portion of said upper member so that said lower member is positioned outwardly relative to said upper member in a transverse direction of said vehicle body,
   wherein each of said upper member and said lower member has a straight longitudinal axis.

2. A center pillar structure according to claim 1, wherein said upper member is joined to said lower member in such a manner that said upper member is inclined rearward in the longitudinal direction of said vehicle body.

3. A center pillar structure according to claim 1, wherein a lower end portion of said lower member is joined to a side sill of a floor portion of said vehicle body to form a joined portion,
   a reinforcement plate is secured to an outer side of said lower member in the transverse direction of said vehicle body for reinforcement of said joined portion, and said reinforcement plate is extended from said lower end portion of said lower member to said lower end portion of said upper member and is joined to said lower end portion of said upper member.

4. A center pillar structure, in which a center pillar is provided at an intermediate portion in a longitudinal direction of a vehicle body, said center pillar comprising:

an extrusion molded upper member; and an extrusion molded lower member, wherein (1) an upper end portion of said lower member is joined with a lower end portion of said upper member in such a manner that said lower member is positioned outwardly relative to said upper member in a transverse direction of said vehicle body, (2) said upper member is inclined relative to said lower member in the longitudinal direction of said vehicle body, and (3) each of said upper member and said lower member has a substantially straight longitudinal axis.

5. A center pillar structure according to claim 4, wherein said upper end portion of said lower member has an end face that faces in a transversely outward and downwardly inclined direction of said vehicle body.

6. A center pillar structure according to claim 1, wherein said upper end portion of said lower member has an end face that faces in a transversely outward and downwardly inclined direction of said vehicle body.

* * * * *